(12) United States Patent
Look et al.

(10) Patent No.: US 11,222,250 B2
(45) Date of Patent: Jan. 11, 2022

(54) COMBINED EVENT DRIVER AND FINANCIAL CARD

(71) Applicant: Veritec, Inc., Golden Valley, MN (US)

(72) Inventors: Thomas F. Look, Ramsey, MN (US); Van Thuy Tran, Golden Valley, MN (US)

(73) Assignee: Veritec, Inc., Golden Valley, MN (US)

( * ) Notice: Subject to any disclaimer, the term of this patent is extended or adjusted under 35 U.S.C. 154(b) by 0 days.

(21) Appl. No.: 16/410,680

(22) Filed: May 13, 2019

(65) Prior Publication Data

US 2019/0272455 A1 Sep. 5, 2019

Related U.S. Application Data

(62) Division of application No. 13/849,011, filed on Mar. 22, 2013, now Pat. No. 10,289,942.

(60) Provisional application No. 61/614,278, filed on Mar. 22, 2012.

(51) Int. Cl.
| | | |
|---|---|---|
| *G06K 19/06* | (2006.01) | |
| *G06K 19/067* | (2006.01) | |
| *G06Q 90/00* | (2006.01) | |
| *G06Q 50/26* | (2012.01) | |
| *G06Q 20/34* | (2012.01) | |

(52) U.S. Cl.
CPC ....... *G06K 19/06187* (2013.01); *G06K 19/06* (2013.01); *G06K 19/067* (2013.01); *G06K 19/06037* (2013.01); *G06Q 20/357* (2013.01); *G06Q 50/265* (2013.01); *G06Q 90/00* (2013.01)

(58) Field of Classification Search
CPC ....... G06K 19/06187; G06K 19/06037; G06Q 20/357; G06Q 50/265; G06Q 90/00
USPC ................................. 235/487, 492
See application file for complete search history.

(56) References Cited

U.S. PATENT DOCUMENTS

| | | | |
|---|---|---|---|
| 6,012,635 | A | 1/2000 | Shimada et al. |
| 7,172,112 | B2 | 2/2007 | Bonalle et al. |
| 7,370,805 | B2 | 5/2008 | Smith et al. |
| 2005/0133590 | A1 | 6/2005 | Rettenmyer et al. |
| 2012/0123937 | A1* | 5/2012 | Spodak .............. G06K 19/0723 705/41 |

\* cited by examiner

*Primary Examiner* — Jamara A Franklin
(74) *Attorney, Agent, or Firm* — Kagan Binder, PLLC

(57) ABSTRACT

Combined use transaction cards are disclosed including preferably the functionality of being usable for conducting a financial transaction along with the additional functionality for activation or access to at least one other event. Many types of non-financial events are contemplated such as for access or entry, employee need, student need, and the like. Such cards preferably utilize electronically readable means as may be provided to such cards, such as including magnetic stripes, RFID transponders, OCR text, and one dimensional or two dimensional bar codes.

19 Claims, 2 Drawing Sheets

COMBINED EVENT DRIVER AND FINANCIAL CARD

CROSS-REFERENCE TO RELATED APPLICATION

This application is a divisional of U.S. application Ser. No. 13/849,011, filed on Mar. 22, 2013, which claims priority to U.S. Provisional Application No. 61/614,278, filed Mar. 22, 2012, the entire contents of which are incorporated herein by reference in their entireties.

TECHNICAL FIELD

The present invention relates to transactional type cards that include a data storage aspect on or within the card construction, and in particular to such transactional card wherein plural diverse card types are facilitated by one card.

BACKGROUND

The large number of financial, ID, loyalty, membership, security and other cards that are carried by individuals is growing based upon the introduction of cards for loyalty programs, memberships, and the like in addition to financial transactional cards or credit cards, which financial cards now also include gift cards, and prepaid cards. Some, or in individual cases, most of these cards carry a risk of identity theft and potential financial risk. For certain cards, such as an entry card that controls opening a security door or the like, the risk is higher in that a person improperly utilizing such card can be responsible for personal attacks and theft of goods or other property. Certainly a way of minimizing the volume of cards carried by an individual so as to limit the risk of identity or property loss and personal injury is to reduce the number of cards carried by an individual in order to minimize the amount of personal information that can be exposed if any such card is lost or stolen and also to disguise the true nature of the card where personal security is involved.

As such, it is a goal of the present invention to reduce the potential for fraud and theft based upon improper usage of any of these types of card. The primary problem is that individuals carry too many cards and the potential for improper use is increased not only by the shear number of cards, but also by the increase inability to keep track of all such cards. With so many cards being typically carried by an individual, a person could easily misplace one card and not realize it for quite some time.

SUMMARY

In one aspect of the present invention, transactional cards and methods of making and use are contemplated with the goal of reducing the number of cards carried so as minimize risk of identity theft, property loss and/or the threat of personal injury. Cards and methods of the present invention can also add value to certain types of cards so as to increase a user's standard of care to such cards (i.e. the care a user may give to a credit card versus a lunch type loyalty card). Moreover, with cards and methods of the present invention, it is a goal to add security with a reduction of risk of important information exposure upon the loss or theft of such a card.

According to an aspect of the present invention, a combined financial card and secondary use (or more) card is contemplated. For example, combined use card could comprise a financial card and electronic key security door card. With two different card type use methods combined into one card there are many advantages. For one, there simply is less to carry and a higher potential for the card holder to protect the card.

A combined card has a greater utility for the card holder than a single use card. Many add on services such as paying for school lunch, getting access to costly resources, protecting property, locating individuals inside a complex, and the like are often difficult to develop, implement and manage. A combined card makes developing, implementing and managing these services much less complex.

In another aspect of the present invention, a card identification means can be controlled for protecting an individual's identity where little or no personal information is stored on a card such as a hotel room key card but can also range to provide more identity information as may be required up to a full identification card where all of the card holder's demographic data is on the card.

Cards and methods of the present invention can vary, but preferably such cards include a financial card aspect. The type of financial card can also vary such as it can be provided as a gift card, a prepaid card, a debit card, and/or as a credit card to suit the requirements of a particular application.

Typical financial cards include an electronically readable means such as a magnetic stripe, an RFID Transponder, a one dimensional ("1D") barcode, a two-dimensional ("2D") barcode, text in the form of optical character recognition characters ("OCR text"), and the like can be employed to suit the application requirements. The present invention advantageously uses such electronically readable means for combination purposes in accordance with the present invention. For example, gift type and prepaid type cards can be pre-finished as they typically only require encoding of a portion of the provided magnetic stripe, preferably the third track, and/or by way of other electronically readable means. Such cards are ideal for widely distributed, low cost applications.

A single card could serve many different applications, for example, as an identification card, a financial card, a keyless electronic door opener, a touch and go toll-way payment card and/or others. There are a vast diversity of applications that can be serviced from a single card utilizing technology as is presently already provided onto or within the construction of cards today.

Other advantages for a combined card include the ability to use such cards as a marketing tool. Loyalty cards can be used to drive patrons to multiple distinct branded locations. Security cards can be used to differentiate a business as being more secure than others. Incentive cards can be used to increase spending at a particular business or businesses. Business identification cards that stay with a user can also have monetary value for the card holder. Patron preference cards also can be advantageously used for tracking a card holder's purchases and locations.

In one preferred aspect of the present invention, a combined use transactional card is provided including electronically readable means by which a financial transaction can be conducted, the card also comprising further electronically readable means that is also functionally part of the transactional card and that is encoded with data that when read by an electronic data reader for the source of electronically readable data services an event that is not associated with the financial account.

In preferred methods making cards of the present invention, a combined use transactional card is made including electronically readable means by which a financial transaction can be conducted, the card also comprising further electronically readable means that is also functionally part of the transactional card the card being made by the steps of:

encoding financial data by which a financial transaction can be conducted onto the electronically readable means provided to the transactional card; and encoding non-financial data in the further electronically readable means provided on the transactional card that when read by an electronic data reader for a source of electronically readable data can service an event that is not associated with the financial account.

In preferred methods of using a combined use transactional card including electronically readable means by which a financial transaction can be conducted, the card also comprising further electronically readable means that is also functionally part of the transactional card and that is encoded with data that when read by an electronic data reader for the source of electronically readable data services an event that is not associated with the financial account, the method comprises the steps of:

electrically reading the further electronically readable means from the transaction card and determining the data that services an event not associated with a financial account; and triggering a servicing for an event based upon an acceptability of the data for such specific purpose.

BRIEF DESCRIPTION OF THE DRAWINGS

The present invention will be further explained with reference to the appended Figures, wherein like structure is referred to by like numerals throughout the several views, and wherein:

FIG. 9 is a schematic illustration of another transactional combined card of the present invention as is usable for electronic reading by OCR readers, for example as may be utilized for registration for events, classes, or the like.

DETAILED DESCRIPTION

Figure 1:
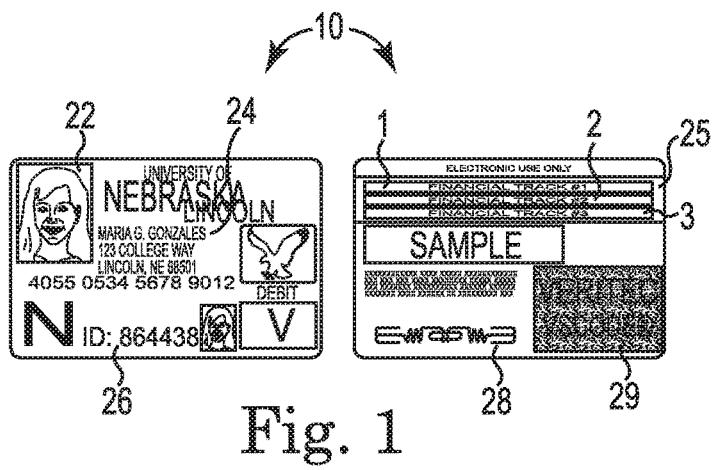
FIG. 1 is a front and back view of a combined financial type card of the present invention that includes identification aspects along with multiple electronically readable card components, any one or more of which can be provided with information and features in accordance with the present invention.

Referring now to the Figures, wherein the components are labeled with like numerals throughout the several Figures, and initially to FIG. 1, one preferred configuration of a combined use transaction card 10 of the present invention is illustrated. By combined use, as will be more fully understood from the description of examples below, it is meant that the card preferably includes financial card aspects and features so that a financial transaction of any type can be conducted based upon data electronically readable from the card 10 along with data that is also electronically readable from some aspect or feature of the card 10 for the purpose of servicing some event. Event(s) as used in accordance with the present invention can comprise any transactional activity that is not associated with the financial account. Examples of financial transactions in accordance with the present invention along with examples of many different types of events also in accordance with the present invention are described below.

One example of methods and cards of the present invention is a combined financial card 10 with an electronic key security door means. The financial card could have the normal components of credit cards such as the 16 digit financial account number, the card expiration date, the CVV security number, the magnetic stripe containing the financial account data on tracks one and two (as explained in greater detail below), but such card can also not have personal information of the card holder displayed or encoded to the card. This type financial card is called a gift card or a prepaid card, or if money can be reloaded to the financial card account, such a card is referred to as a reloadable card.

Figure 8:
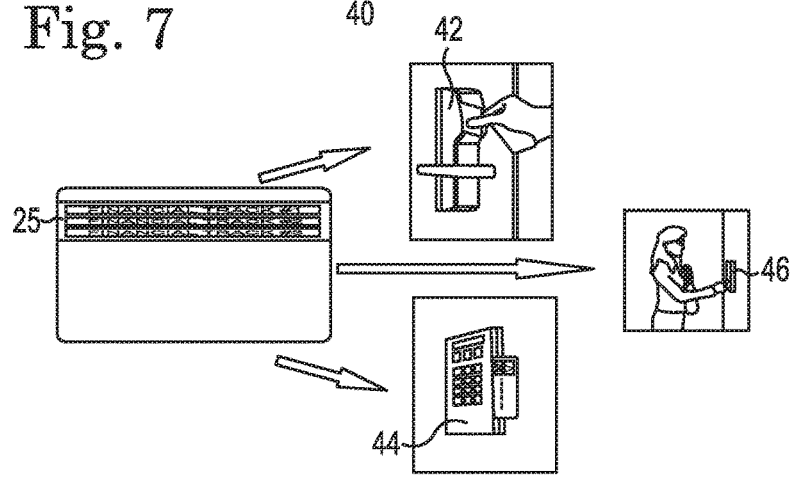
FIG. 8 is a schematic illustration of another transactional combined card of the present invention as is usable for electronic reading by magnetic stripe readers as can be provided for unlocking doors or the like, for examples.

An electronic key can take any one of several forms with the most common being a card with a magnetic stripe that is provided as a door opener card and a proximity door opener card. Hotels and like commonly use the former type while business locations and residential access systems often use the proximity type card for door entry. Using a magnetic stripe card, the card can be passed though a magnetic stripe reader slot that can be mounted on the door, as shown in FIG. 8, that is operatively connected with a door unlocking/opener mechanism or otherwise as a reader is provided adjacent to the door unlocking/opener mechanism. Data encoded on the magnetic stripe can be read by conventionally known electronic means and compared to allowed data or acceptable values in order to determine if the door locking mechanism will be unlocked. Using a proximity card, the card is passed near a RFID transponder reader that can be provided on the door unlocking/opener mechanism or adjacent to the door unlocking/opener mechanism. Data on a RFID transponder of a proximity card can be read by electronic means and compared to allowed data or acceptable values in order to determine if the door unlocking/opening mechanism will be unlocked.

While financial cards of the prior art have had magnetic stripes and often RFID transponders, both of which could be used to open keyless security doors, both the magnetic stripe and the RFID transponders have been encoded with financial account data or the financial account holder identification number or related financial information.

In accordance with one aspect of the present invention, combined use cards can take advantage of the conventional manner by which magnetic stripe cards are made and encoded with financial information. For example, according to standard use today, only the first two tracks of the magnetic stripe are encoded with financial account data. RFID transponders typically have similar data coded therein as is encoded in a magnetic stripe or may just be coded with a control number representing a financial account holder.

Methods and cards of the present invention would similarly have a first and second track of the magnetic stripe encoded with financial account data. In accordance with the present invention, a third track for data is also provided as can be provided within the magnetic material of conventional card stripes or such additional data track could be added integrally or as a separate component. The third track could be utilized to encode additional non-financially related data, such as data that contains the electronic key security door data. Where a RFID transponder is utilized in a card construction, data is encoded into the transponder which data can be read to act as electronic key security door means. An electronic key system is but one example in accordance with the present invention. The present invention is preferably directed to a combined use card that includes encoded and electronically readable data to function as a financial card, and that also provides a new level of service, requiring reading other electronic data, which is not related to servicing the financial card or account.

A financial card provided as a combined use card, as described above, that is provided with a three track magnetic stripe including the first two tracks encoded with financial account data and the third track encoded with other event data. The other event data may alternatively be provided by a distinct or similar other electronically readable feature that is functionally part of the combined use card. In any case it is preferable to provide a combined use card with financial transaction functionality along with another event functionality. Any source of electronically readable data, that is functionally part of the financial card, and that is encoded with data, that when read by an electronic data reader, can service an event that is not associated with the financial account.

The third track of a magnetic stripe card can be written by any of the known technology at the time of coding the first and/or second tracks with financial information, or may be done at a later time, such as at check in at a hotel. Conventional data writing devices as are presently used can be utilized provided that they are controlled to write to the third track, for example, specifically.

In the case of combining financial transaction functionality and electronic key functionality on a combined use card, there are specific advantages, for example, to a hotel type situation.

A combined financial card and electronic key security door card could be provided by the hotel to the guest. The card, at a minimum would preferably have the capability of being used as a financial card and a means to open the guest's room door. While the discussion below is limited to magnetic stripe electronic key security door means, a proximity card or any other suitable electronic key security door means could be substituted within the scope of the invention.

Most hotels use an electronic key door opener mechanism to allow their guests to safely enter their room without a key where the keys typically have the room number on it. In the past some hotels have written personal information such as name, financial card number, address and the like in the magnetic stripe of a room key card. Methods and card of the present invention can preferably only have a card serial number, the hotel room number and optionally the included days or dates of the guest's stay written to the card. All this data would be encoded in track 3 of the magnetic stripe of a card as encrypted data. Preferably, no guest personal data would be placed in the magnetic stripe.

The card appearance could be as any other gift or prepaid financial card making it a less likely target for criminals wanting to access a hotel room with potential threat to the guest. Because the card has stored monetary value, the guest would be more likely to protect the card as increasing the care associated with such a card. Such a card could also become the property of the guest and be recycled by the guest at other similarly branded hotels by re-encoding track 3 of the magnetic stripe.

Other potential benefits of such a hotel type combined use card could be that the hotel could place a small monetary value in the card, at every check in, to be used as an incentive to purchase goods and services at the hotel. The hotel could send the card to potential customers, preloaded with small monetary value in the card, incentivizing guests to stay at the hotel. Moreover, the card could serve as a loyalty card where a monetary value would be added to the card based on goods and services purchased or other hotel loyalty programs. The card could carry hotel branded graphics including marketing collateral and contact information. In the case where a card has stored monetary value, it is unlikely that the guest would discard the card. As an additional potential, a hotel could provide a card monetary reloading service where the hotel would add a percentage to the reload thereby incentivizing the guest to spend even more money at the hotel and provide additional reasons to stay with the hotel brand.

As another example of the present invention, an employee use card is contemplated. A combined use financial card and electronic key security door card could be provided by the employer to the employee. The card, at a minimum preferably would have the capability of being used as a financial card, and would also be usable to access the company security doors, which also may be used by the company to record time and attendance. While the discussion below is described with respect to proximity electronic key security door means, any other suitable electronic key security door means, like a magnetic stripe, OCR, bar codes and the like, could be substituted within the scope of the invention.

The proximity electronic key would provide a safe entrance to company facilities. The proximity electronic key would allow tracking an employee inside company facilities always assuring the location of the employee in an emergency. Because the card can have stored monetary value, the employee would be more likely to protect the card. All information in the proximity and displayed as graphics on the card could be designed to provide maximum protection for the employee's identity if the card is lost and found by a scammer.

Other potential benefits that can be obtained with a combined use employee card include that an employee could receive their wages, reimbursement funds, bonuses and any other monetary value transferred as direct deposit into the financial account represented by the employee financial card. This method would be potentially safer than checks, cash or other monetary transfer means. Direct deposit, as described above, compared to paper checks would be less costly for the employer. As a financial card, the employee could get cash from an ATM, pay for goods and services at merchants, write checks against the financial account represented by the financial card and order goods by phone or online, all using one financial card and account.

Other uses within other industries are contemplated. For example, school identification cards with a financial card purse for lunches and sundries and electronic key security lock means for using computer resources or checking books out of the library. Health Club membership cards can be provided with a financial card for purchasing food, trainer time and sports gear and electronic key security locker opening means. A bank financial card can be provided with an electronic key security door means for a safety deposit box. Over-the-road trucker financial cards can be provided for traveling expense advances and as an electronic key security gate means to enter a warehouse gate. Wholesale Club financial cards could be used to purchase goods and services from the club and an electronic key security door means to enter the club door and check into the club.

While the above industries are just a sampling of the many uses for a combined use card with financial transactional functionality and electronic key event functionality, there are many more industries that could benefit from the invention. The general features and benefits for this innovative method and cards are that with two different card type methods, financial card and electronic key security door means combined into one card, there is less to carry and a higher potential for the card holder to protect the card. The combined use card has a greater utility for the card holder than a single use card.

Many add on services such as paying for school lunch, getting access to costly resources, protecting property, locating individuals inside a complex, and the like are often difficult to develop, implement and manage. A combined use card of the present invention makes developing, implementing and managing these services much less complex. A card identification means can be controlled for protecting an individual's identity where no personal information is stored on the card such as a hotel room key card to a full identification card where all of the card holder's demographic data is on the card. The type of financial card can vary such as gift, prepaid, debit and credit to suit the requirements of the application. Electronically readable means can comprises any known or developed technique, such as using a magnetic stripe, RFID Transponder, 1D barcode, 2D Barcode, OCR text, and the like and such means can be employed to suit the application requirements. Since gift and prepaid cards can be prefinished and only require encoding of the magnetic stripe third track and or another electronically readable means, they are ideal for widely distributed, low cost applications. A single card could easily serve four or more applications, such as including functionality as an identification card, a financial card, a keyless electronic door opener and a touch and go toll-way payment card. Note the vast diversity of the applications that can be serviced from a single card. A combined use card can also be a strong marketing tool. Loyalty cards can be used for driving patrons to multiple branded locations. Security cards can be used to differentiate a business as being more secure. Incentive cards can be used to increase spending at a business. Business identification cards can be provided that stay with and has value for the individual card holders. Patron preferences cards can be provided that track the card holder's purchases and locations.

In accordance with a preferred aspect of the present invention, combined use cards comprises a financial transactional card with at least one electronically readable data means that services an event that is not associated with the financial account.

With reference to the card illustrated in FIG. 1, an identification and financial card 10 is illustrated that is a multipurpose card that has two different card types. Specifically, a student ID card and a financial debit card is shown that also includes multiple different electronically readable data means that can each service at least one event and that together can service any number of multiple events.

As an identification card, the card's primary purpose is to verify and authenticate a student's identification. For visual verification and authentication the card graphics have the student's facial image 22, name and demographic data 24 and signature, both electronic and hand written. Visual security could include the smaller halftone facial image that helps prevent switching pictures, the hologram and other overt and covert means that are aimed at preventing tampering and forgery. As a financial card, the illustrated card's secondary purpose can be a means to provide the student a financial card tied to a bank account. While the card shown is a Visa branded open loop card, the scope of the invention would include closed loop financial cards. This financial account would allow the student to purchase goods and services on campus as well as anywhere else in the world. A university could also use the card account as a means of depositing scholarship awards, refunding tuition or other school funds and other purposes as required. Note that the card's magnetic stripe 25, track #1 and track #2 are set up to be used during financial transactions. Financial account and financial account holder data read on these tracks, by merchant POS hardware, can be electronically forwarded to the bank or bank processor to implement and complete the financial transaction.

A plurality of forms of electronically readable data are illustrated and cane be used as means fro servicing many events.

OCR Readable Text 26—For example, a students ID number can be printed in an OCR-B font as shown at 26. This font would be readable using an Optical OCR font reader, as are conventionally known. While a primary use can be to electronically locate the student's records in a database (the event), a secondary use could be to identify the student and print a personalized test, for example as an event, to assure the reliability of the testing system.

RFID Transponder 28—As another example, a RFID transponder is shown at 28, which element is a longer read range device that is read by an antenna emitting RF energy and collecting a return signal from the RFID transponder. The returned signal data could allow the student, for example, to pass through doors where authorized (an event) and be tracked throughout the university (an event) using multiple locating antennas.

Magnetic Stripe Track #3—As another example, a magnetic stripe is illustrated at 25, wherein tracks 1 and 2 of the magnetic stripe are preferably used for the financial data (as conventionally done) and the third track is available for a user defined purpose. In the example shown, data that can be written to and thus read from the third track 3 can be used, for example, for checking books out of the library (an event). With seventy numerical characters (as is typically provided and discussed in more detail below), all of which are rewritable, the third track 3 could have one segment for the library use with another segment used as a dynamic purse for small monetary purchases such as purchases from a pop machine (an event).

A two-dimensional bar code 29, such as preferably comprising a VSCode® 2D Barcode, which technology is commercially available from Veritec Inc., of Golden Valley, Minn. —a two-dimensional bar code, such as the Veritec VSCode® barcode holds up to 2000 bytes of data as shown. A simple web type camera, such as can be attached to a computer can read such a VSCode® barcode. In this example the VSCode® barcode could have all the data printed on the card, all the fixed data in the electronically readable data sources, a facial image of the card holder, multiple fingerprint minutia for the card holder, other application data for purposes such as health care or scholarship administration, other application data to drive events and data for other university requirements. It is contemplated that with such data ability of these barcode, many other possibilities can be developed with respect to all of the possible events the VSCode® barcode alone could drive.

Figure 2:
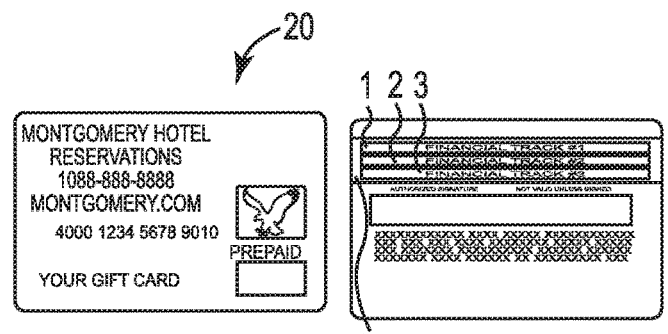
FIG. 2 is a similar front and back view of a combined financial type card of the present invention as that shown in FIG. 1 that includes financial information and electronically readable features related to a magnetic stripe component.
Figure 3:
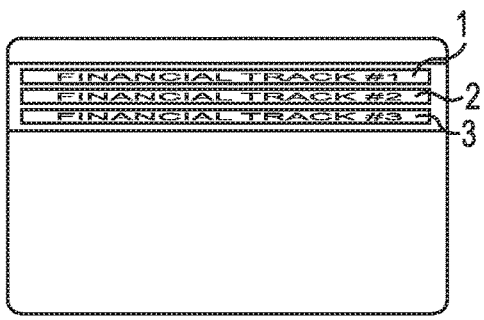
FIG. 3 is a view of a surface of a transaction card with a magnetic strip illustrating three data tracks as are provided, wherein the first two tracks are coded with financial information and data as may be relevant to conducting a financial transaction, while the third track or service track is provided as a rewritable data track that can be divided into data segments.

A financial card 20 with magnetic stripe 25 is also illustrated in FIG. 2 as a simple application of the present invention.

The financial card 20 could be a gift card that that is non reloadable or a prepaid card that can be reloaded with additional funds. Note that in this example a customer's name is not on the card nor does any information about the customer appear on the card and the same can be true for the magnetic stripe. This card can be printed and the magnetic stripe encoded in large volumes at a very small cost. As above, preferably tracks 1 and 2 of the magnetic stripe are used for the financial data, while the track 3 is available for a user defined purpose.

Magnetic Stripe Track #3—In this example as shown, data written to and that car be read from track 3 is preferably used for an event like unlocking a guest room door in a hotel. With seventy numerical characters, all of which are rewritable, track 3 could have one segment for unlocking the door with another segment used as a dynamic purse for small monetary purchases such as purchases from a pop machine (an event).

While multiple different methods have been described for placing electronically readable data on a transactional card including a magnetic stripe, a VSCode® 2D barcode, OCR readable text, and a RFID transponder, the following discussion is directed to the use of magnetic stripes as are commonly available as an electronically readable data source provided on most every financial card.

Magnetic Stripe—A magnetic stripe card is a type of card capable of storing data by modifying the magnetism of tiny iron-based magnetic particles on a band of magnetic material on the card. The magnetic stripe, sometimes called swipe card or magstripe, is read by physical contact and swiping past a magnetic reading head. A number of International Organization for Standardization standards, ISO/IEC 7810, ISO/IEC 7811, ISO/IEC 7812, ISO/IEC 7813, ISO 8583, and ISO/IEC 4909, define the physical properties of the card, including size, flexibility, location of the magstripe, magnetic characteristics, and data formats. The magnetic stripe is typically located 0.223 inches (5.56 mm) from the edge of the card, and is 0.375 inches (9.52 mm) wide. The magnetic stripe usually contains three tracks, each 0.110 inches (2.79 mm) wide. Tracks one and three are typically recorded at 210 bits per inch (8.27 bits per mm), while track two typically has a recording density of 75 bits per inch (2.95 bits per mm). Each track can either contain 7-bit alphanumeric characters, or 5-bit numeric characters. There are up to three tracks on magnetic cards known as tracks 1, 2, and 3. Track 3 is virtually unused by the major worldwide networks such as Visa, and often isn't even physically present on the card by virtue of a narrower magnetic stripe. Point-of-sale card readers almost always read track 1, or track 2, in case one track is unreadable.

Track 1, Format B:
Start sentinel—one character (generally '%')
Format code="B"—one character (alpha only)
Primary account number (PAN) —up to 19 characters. Usually, but not always, matches the credit card number printed on the front of the card.
Field Separator—one character (generally '^')
Name—two to 26 characters
Field Separator—one character (generally '^')
Expiration date—four characters in the form YYMM.
Service code—three characters
Discretionary data—may include Pin Verification Key Indicator (PVKI, 1 character), PIN Verification Value (PVV, 4 characters), Card Verification Value or Card Verification Code (CVV or CVK, 3 characters)
End sentinel—one character (generally '?')
Longitudinal redundancy check (LRC)

Track 2: This format was developed by the banking industry (ABA). This track is written with a 5-bit scheme (4 data bits+1 parity), which allows for sixteen possible characters, which are the numbers 0-9, plus the six characters : ; < = > ?. The data format is as follows:
Start sentinel—one character (generally ';')
Primary account number (PAN) —up to 19 characters. Usually, but not always, matches the credit card number printed on the front of the card.
Separator—one char (generally '=')
Expiration date—four characters in the form YYMM.
Service code—three digits. The first digit specifies the interchange rules, the second specifies authorization processing and the third specifies the range of services
Discretionary data—as in track one
End sentinel—one character (generally '?')
Longitudinal redundancy check (LRC) —it is one character and a validity character calculated from other data on the track. Most reader devices do not return this value when the card is swiped to the presentation layer, and use it only to verify the input internally to the reader.

Track 3: Track 3 can be encoded with at 210 bits per inch equaling 107 digits of the numbers 0-9, plus the six characters : ; < = > ?. To use track 3 as a key card in accordance with the present invention, such as for unlocking a hotel room door, track 3 could be encoded with the guest's reservation number (a sequential # assigned to every reservation), room number, checkin date/time, number of nights for the stay or the checkout date/time, and sometimes the guest name (usually just the last) using the device that encodes keycards. The data could be encrypted to ensure that a common card reader could not be used to read the data and forge additional key cards to break into the hotel rooms.

While the above discloses a method of using the magnetic stripe as part of a method to service the event of unlocking a hotel room door, many similar applications (event drivers) are also contemplated that are within the scope of this invention.

Figures 4, 5:
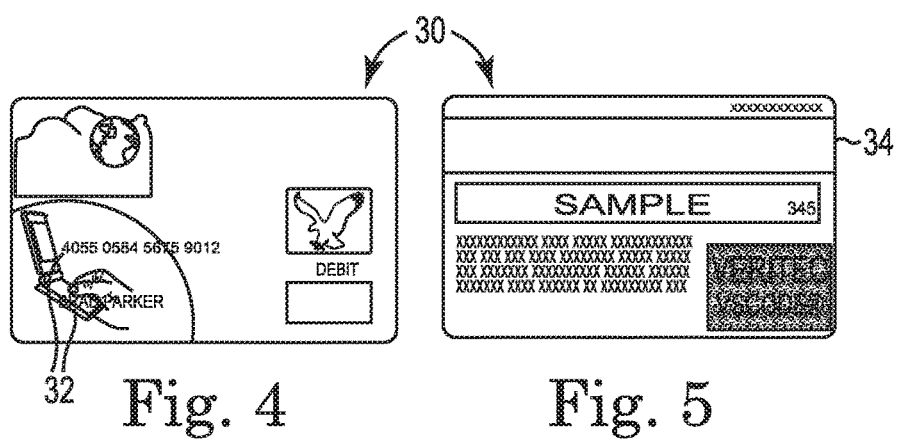
FIG. 4 is a front view of a financial type transaction card including features of the present invention.
FIG. 5 is a back view of the card of FIG. 4 also illustrating features of the present invention.

In FIGS. 4 and 5, an example of a financial card is further illustrated. In particular, a plastic transactional card 30, with card types including credit, debit, prepaid and gift cards, as such cards can be used by an individual to conduct financial transactions tied to a financial account, that is issued by a bank. Such cards 30 may contain textual data 32 including the individual's name, the 16 digit financial account number, the expiration date of the financial card, a 3 digit security code called the CVV and a magnetic stripe 34 with preferably at least the same data that can be electronically read. The card will likely have graphics that depict information about the card issuer, the card sponsor such as Visa, legal information for the issuing bank, a signature panel for debit and credit cards and logo's, called bugs, for ATMs or businesses that accept the card. The 16 digit financial card account number and the expiration data are enough data to conduct most financial transactions serviced by the card type. Credit and debit cards will have the card holder's name while prepaid and gift cards will likely be anonymous.

In accordance with the present invention, events that are not associated with a financial transaction have been described above. Examples of such events are illustrated within FIGS. 6-10, which events can be enacted and/or controlled by the features of electronically readable data on a financial card in accordance with the present invention.

Figure 6:
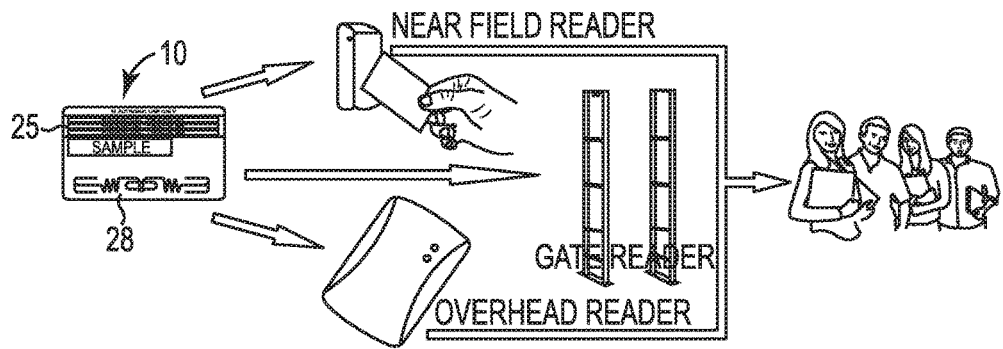
FIG. 6 is a schematic illustration of a transactional combined card of the present invention as is usable for electronic reading by RFID transponder readers of different types in combination with a magnetic strip for electronic reading.

As illustrated in FIG. 6, a RFID transponder 28 can have encoded, in the device's integrated circuit, identification data pertaining to the card holder. Additional data such as authorization for entrance, class schedule for testing, or any other data that services the card holder's activities. An RFID transponder 28 most often has a manufacturing unique code, embedded in the integrated circuit that is added to an encryption scheme so that the same data cannot be encoded in a different RFID transponder. Check digits, if data capacity is available, can help assure an accurate read. The variable data in the RFID transponder can be rewritten many times which allows data to be changed frequently if required. A RFID transponder 28 can be read typically at up to 6 meters of distance and with 2000 other RFID transponders at the same time.

Figure 7:
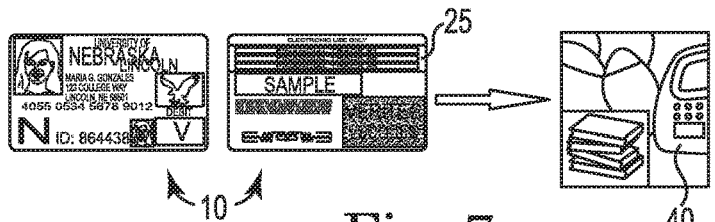
FIG. 7 is another schematic illustration of a transactional combined card of the present invention as is usable for electronic reading magnetic stripe readers, such as can be utilized for checking things out from a library or the like, for example.

As illustrated in FIGS. 7 and 8, magnetic stripe track 3 usages are illustrated as such have been discussed above. A magnetic stripe 25 that is provided on a financial card, would preferably have a magnetic fingerprint that can be used for authentication. All data can be encrypted and rewritten as required. Data can have check digits to assure accurate reads and there is some possibility of redundant data. A magnetic stripe 25 requires a contact reader which negates any non-contact, reading distance. A reader 40, for use in a library check out situation is shown in FIG. 7. Readers 42, 44, and 46 are illustrated in FIG. 8 as examples that can be used for door entry control.

Figure 9:
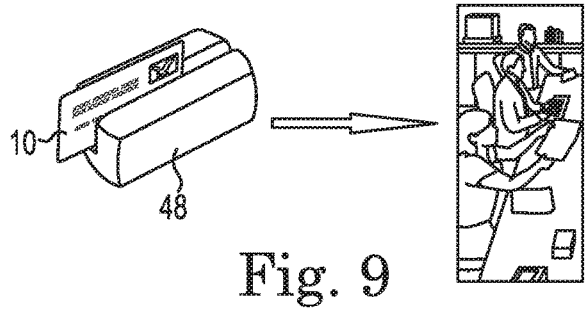

As shown in FIG. 9, OCR Text is visually and electronically readable. By the consequence of being readable text, there is very little security but check digits do reasonably assure that the electronically read data is accurate. OCR text readers use an optical method of acquiring an image of the area containing the OCR text and load that image to a computer. Computer software algorithms determine if readable text is in the field of view, locate the text and decode the found text outputting characters in the predetermined ASCII set. While optically the OCR Text can be read at short distances, most often the card, with the text, is in a controlled environment such that the OCR text is in a known location. A conventional reader 48 is illustrated as applicable to methods of the present invention.

Figure 10:
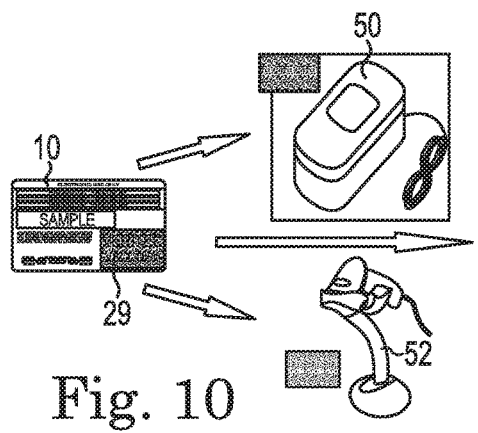
FIG. 10 is a schematic illustration of yet another transactional combined card of the present invention as is usable for electronic reading by two-dimension bar-code readers of different types as may also read and compare biometric information of a user with data stored within the two dimensional bar code, which code can include multiple uses for events in combination with a magnetic strip for electronic reading.

FIG. 10 illustrates the use of a two-dimensional bar code such as the Veritec VSCode® barcode that has typically 1500 bytes of user binary data. This data can be encrypted in sections as well as being randomized in the code structure. Reed-Solomon block techniques are used for error correction. Normal uses for the code include biometric identification means, demographic data for the card holder, data to drive events and service applications and issuer required information. While optically the VSCode® barcode can be read at short distances, like the OCR text, most often the card, with the code, is in a controlled environment such that the code is in a known location. In FIG. 10, a fingerprint scanner 50 is shown as can be used with a code reader 52 to verify biometric information and code usage.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

The invention claimed is:

1. A combined use financial transactional card including first electronically readable means that is encoded with financial account data by which a financial transaction is to be conducted from a financial account along with graphics on a face of the card that depict information about at least one of a card issuer, a card sponsor, and an issuing bank, and a second electronically readable means of the transactional card that is encoded with access ability data that comprises at least one of cardholder identification or biometric data, demographic data of a cardholder, data associated with an event other than a membership number, data associated with a service other than a membership number, or other issuer, card sponsor or issuing bank data, and that when read by an electronic data reader for the source of electronically readable data services an access ability for a card user, which access can be obtained based upon the access ability data without utilizing the financial account data or based upon data of any financial transaction.

2. The combined use transactional card of claim 1, wherein the first and second electronically readable means are functionally part of the transaction card comprises a magnetic stripe.

3. The combined use transactional card of claim 1, wherein the first and second electronically readable means that are functionally part of the transaction card comprises an RFID transponder as a source of electronically readable data that services the access that is not associated with the financial account.

4. The combined use transactional card of claim 1, wherein the first and second electronically readable means that are functionally part of the transaction card comprises optical character recognition text.

5. The combined use transactional card of claim 1, wherein the first and second electronically readable means that are functionally part of the transaction card comprises a two-dimensional barcode.

6. The combined use transactional card of claim 1, wherein at least one of the first and second electronically readable means comprises an image or text that is read by an imaging device to read or decode the respective data of that electronically readable means.

7. The combined use transactional card of claim 2, wherein the magnetic stripe comprises plural distinct data tracks with at least one track that contains the financial account data and at least a segment of another track that provides for the source of electronically readable data that services the access ability that is not associated with the financial account.

8. The combined use transactional card of claim 7, wherein two tracks are utilized for financial transaction purposes, and at least a segment of a third track is used as the source of data for servicing the access ability not associated with the financial account.

9. The combined use transactional card of claim 6, wherein the access ability data is encoded as a bar code on a surface of the card as the second electronically readable means.

10. A method of making a combined use financial transactional card including graphics on a face of the card that depict information about at least one of a card issuer, a card sponsor, and an issuing bank, the card also comprising a first electronically readable means by which a financial transaction is to be conducted, and a second electronically readable means that is also functionally part of the transactional card, the method comprising the steps of:
   encoding financial data by which a financial transaction is to be conducted onto the first electronically readable means provided to the transactional card; and
   encoding access ability data in the second electronically readable means provided on the transactional card, wherein the access ability data comprises at least one of cardholder identification or biometric data, demographic data of a cardholder, data associated with an event other than a membership number, data associated with a service other than a membership number, or other issuer, card sponsor or issuing bank data, so that when the second electronically readable means is read by an electronic data reader for a source of electronically readable data services an access ability for a card user, which access can be obtained based upon the access ability data without utilizing the financial account data or based upon data of any financial transaction.

11. The method off claim 10, wherein the step of encoding access ability data comprises writing data to at least a separate track segment of a magnetic stripe as provided to the transactional card, which stripe also includes at least one track for receiving data during the step of encoding financial account data.

12. The method off claim 10, wherein the step of encoding access ability data comprises encoding data to an RFID element as provided as part of the transactional card construction, which RFID element also provides data storage for receiving data during the step of encoding financial account data.

13. The method of claim 10, wherein the step of encoding access ability data comprises providing data to the transactional card in the form of optical character recognition text provided as part of the transactional card construction.

14. The method of claim 10, wherein the step of encoding access ability data comprises encoding data to two-dimensional barcode as provided on the transactional card.

15. The method of claim 10, wherein at least one of the steps of encoding data onto the first electronically readable means and the second electronically readable means comprises producing an image or text to a surface of the card.

16. The method of claim 15, wherein the access ability data is encoded as a bar code on a surface of the card as the second electronically readable means.

17. A method of using a combined use financial transactional card including graphics on a face of the card that depict information about at least one of a card issuer, a card sponsor, and an issuing bank, the card also comprising a first electronically readable means that is encoded with financial account data by which a financial transaction can be conducted, and a second electronically readable means that is also functionally part of the transactional card and that is encoded with access ability data that comprises at least one of cardholder identification or biometric data, demographic data of a cardholder, data associated with an event other than a membership number, data associated with a service other than a membership number, or other issuer, card sponsor or issuing bank data, and that when read by an electronic data reader for the source of electronically readable data services an access ability for a card user, which access can be obtained based upon the access ability data without utilizing the financial account data or based upon data of any financial transaction, the method comprising the steps of:
   electronically reading the second electronically readable means from the transaction card and determining the access ability data that services an access ability not utilizing the financial account data or based on data of any financial transaction; and
   triggering an access ability for a card user that is not utilizing the financial account data or based on data of any financial transaction but is based upon an acceptability of the access ability data for such access ability.

18. The method of claim 17, wherein the step of electronically reading the second electronically readable means comprises reading or capturing an image of an image or text as provided on the surface of the card as the second electronically readable means.

19. The method of claim 18, wherein the step of electronically reading the second electronically readable means comprises reading the access ability data as such is encoded as a bar code on a surface of the card as the second electronically readable means.

* * * * *